N. C. NEWELL & J. A. HARRINGTON.
STARCH SEPARATING MACHINE.
APPLICATION FILED APR. 19, 1913.
1,105,294.
Patented July 28, 1914.
3 SHEETS—SHEET 1.
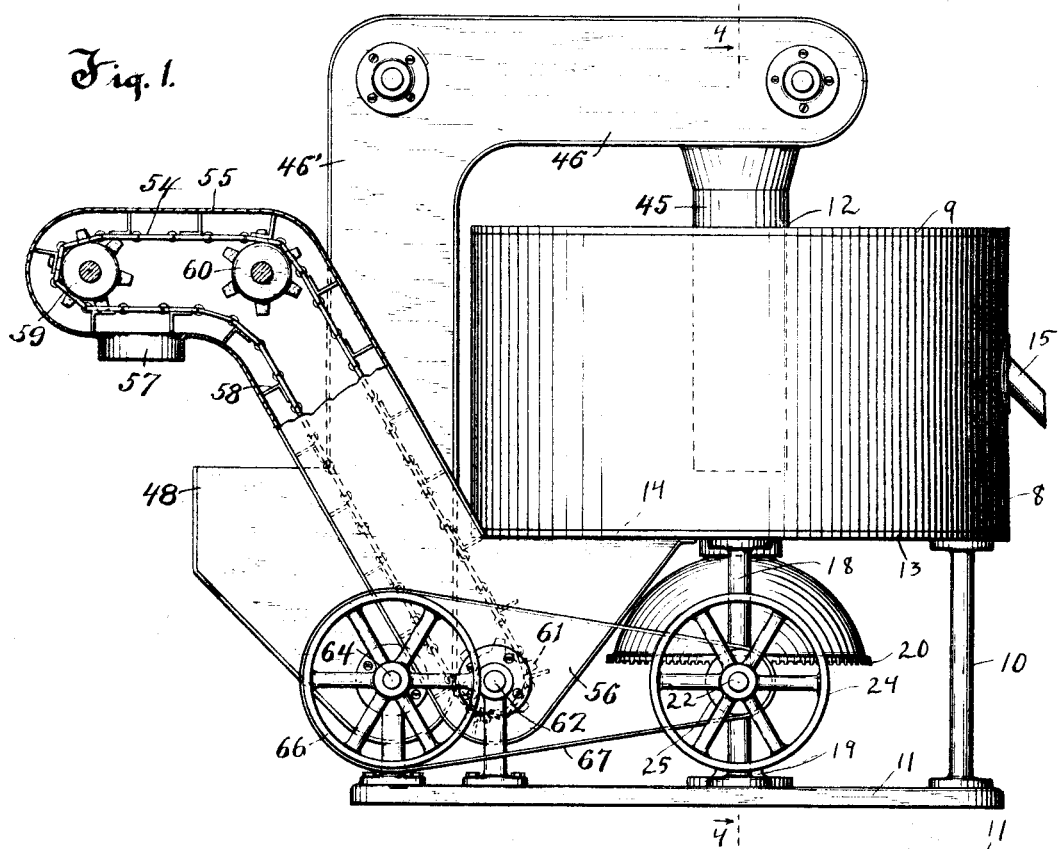
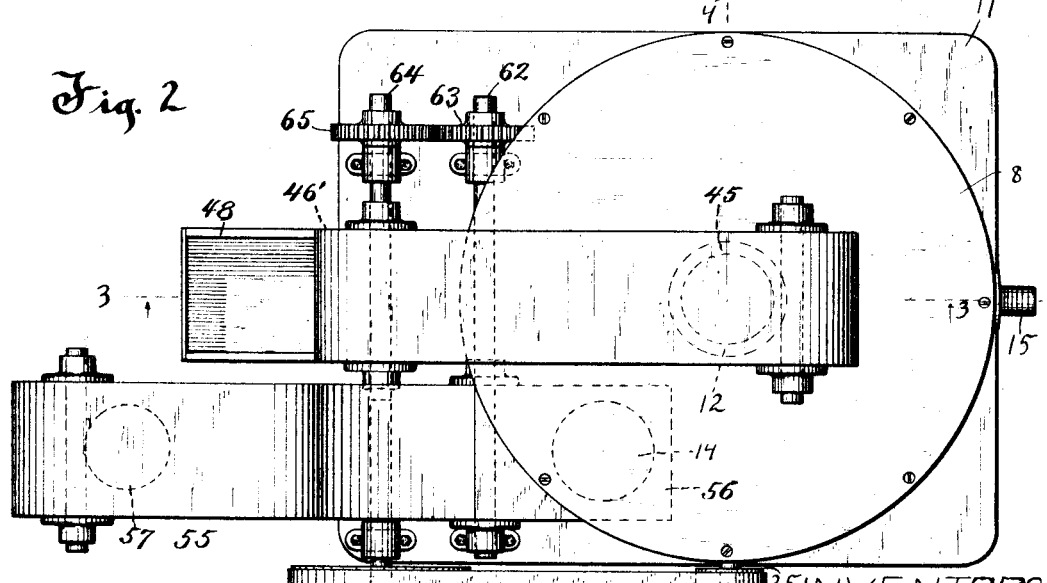
WITNESSES
A. F. Miller.
Katherine Holt
INVENTORS
Nelson C. Newell
John A. Harrington
By Morsell & Caldwell
ATTORNEYS.

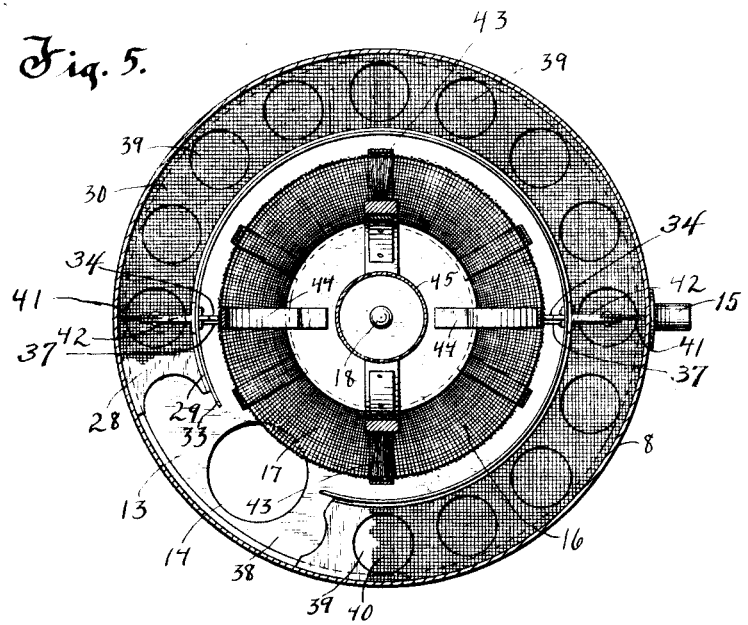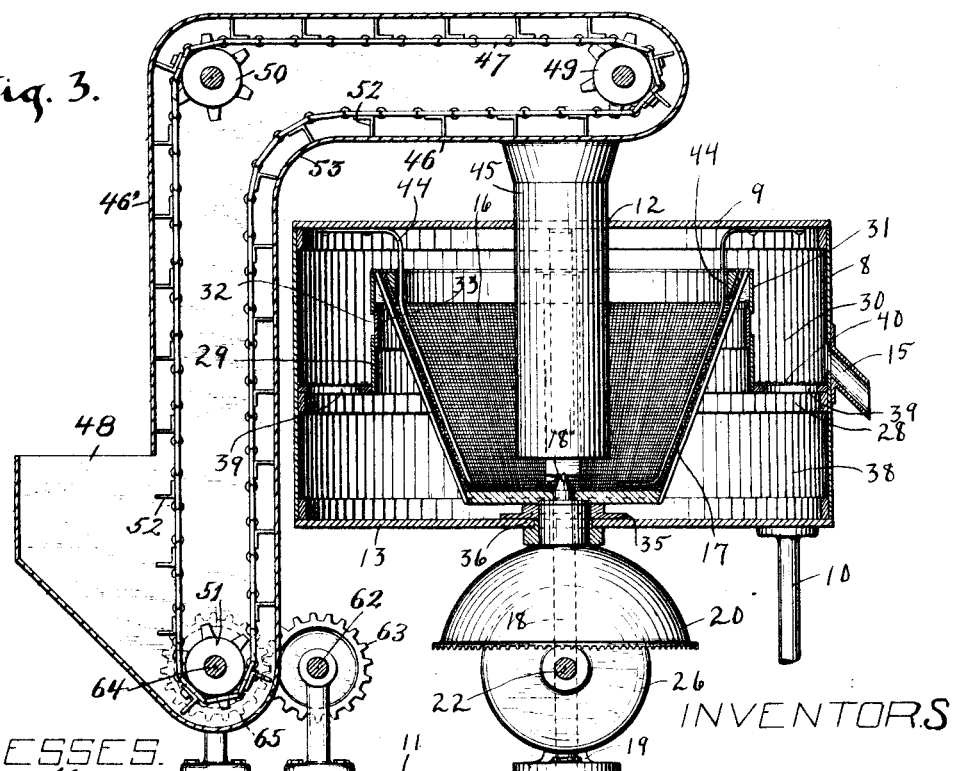

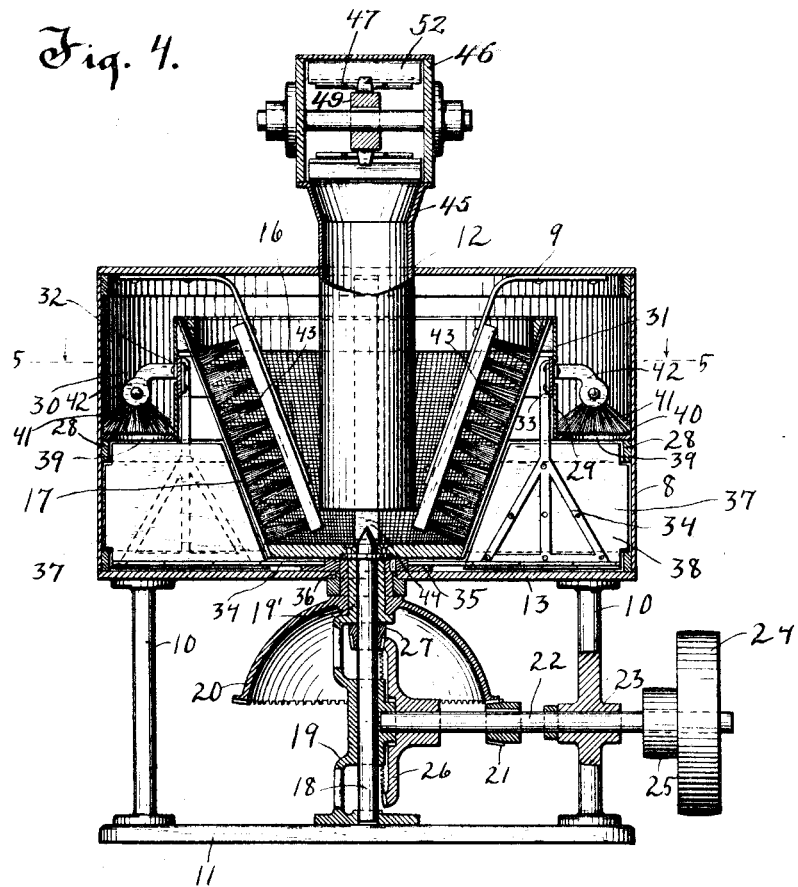

UNITED STATES PATENT OFFICE.

NELSON C. NEWELL AND JOHN A. HARRINGTON, OF RACINE, WISCONSIN.

STARCH-SEPARATING MACHINE.

1,105,294.   Specification of Letters Patent.   Patented July 28, 1914.

Application filed April 19, 1913. Serial No. 762,169.

*To all whom it may concern:*

Be it known that we, NELSON C. NEWELL and JOHN A. HARRINGTON, citizens of the United States, and residents of Racine, in the county of Racine and State of Wisconsin, have invented new and useful Improvements in Starch-Separating Machines, of which the following is a description, reference being had to the accompanying drawings, which are a part of this specification.

This invention relates to improvements in starch separating machines which are particularly adapted for separating or cleaning foreign matter from powdered starch used in the manufacture of candy.

In the candy making industry it is the present practice to form impressions in powdered starch with patterns in substantially the same manner as in casting metal in sand and then pour the melted candy into the impressions to mold the candy to the shape desired. The molded candies when sufficiently cooled to hold their shape are then removed and the starch is again used by making new impressions with the patterns or forms. When the starch is first used it is rather light and fluffy in character and does not work as well at the beginning, as it will when used over and over again due to absorbing moisture and becoming more compact and it is, therefore, of considerable importance to use the starch as many times as possible within certain limits, on account of the improved working and also on account of the saving in cost of new starch. In molding the candy the upper edges of the molded pieces are of irregular form and break off in removing the pieces from the starch, and also the tailings or drippings from pouring the melted candy drop into the starch and harden and when the starch is used over again these small lumps and particles prevent the forming of smooth impressions and when the melted candy is poured into the molds the candy will form with the small lump and particles and the resultant molded pieces will be of very irregular and rough forms.

It is one of the objects of the present invention to provide a starch separating machine which will overcome the before mentioned objectionable features and so separate the foreign matter from the starch that the starch may be used over and over again.

A further object of the invention is to provide a starch separating machine in which the foreign matter which is separated from the starch is in part separated by centrifugal force acting in conjunction with the specific gravity of the materials.

A further object of the invention is to provide a starch separating machine which is of simple construction and is self-cleaning in its operation.

A further object of the invention is to provide a starch separating machine which is provided with an improved bearing for supporting some of the revoluble parts of the machine.

With the above and other objects in view the invention consists of the improved starch separating machine and its parts and combinations as set forth in the claims and all equivalents thereof.

In the accompanying drawings in which the same reference characters indicate the same parts in all of the views: Figure 1 is a side view of the improved starch machine, a part broken away to show interior construction; Fig. 2 is a top view thereof; Fig. 3 is a vertical longitudinal sectional view taken on line 3—3 of Fig. 2; Fig. 4 is a vertical transverse sectional view thereof taken on line 4—4 of Fig. 2; and Fig. 5 is a horizontal sectional view of the drum portion of the machine taken on line 5—5 of Fig. 4.

Referring to the drawings the numeral 8 indicates the fixed circular receptacle or drum of the improved starch machine, 9 the cover therefor, 10 the supporting legs thereof and 11 the base upon which the parts are mounted. The medial portion of the cover is provided with an inlet opening 12 and the bottom portion 13 is provided with a starch discharge opening 14 through which the separated and cleaned starch passes. The receptacle is also provided with an upper side discharge spout or opening 15 through which the foreign matter separated from the starch is passed.

An inner conical revoluble receptacle 16 is mounted within the fixed receptacle and the upwardly diverging conical wall 17 of this receptacle is constructed of fine meshed wire to form a screen through which the powdered starch is passed. The screen receptacle is mounted on the upper end of a vertical shaft 18 which is journaled in a bracket 19 extending upwardly from the base 11, and the upper end 19' of the bracket surrounds the shaft and extends into the bottom portion of the fixed receptacle. A beveled gear 20 journaled on the upper end 19' of the bracket is in mesh with a beveled pinion 21 mounted on the medial portion of a horizontal shaft 22 which is supported at its inner end in a medial portion of the bracket 19. The outer end portion of the horizontal shaft extends through and is supported in one of the legs 10 which is slightly modified to form a bearing 23, and the outer end portion of this shaft is provided with a belt wheel 24 and a pulley 25. A beveled gear 26 mounted on the inner end of the horizontal shaft 22 meshes with a beveled pinion 27 fast on the vertical shaft 18 in order to rotate the shaft 18 at a greater rate of speed than the beveled gear 20.

The receptacle 8 is partly divided medially, vertically by an annular partition 28 having an upturned flange 29 extending from its inner periphery which forms, with the wall of the receptacle, an annular trough 30 to receive the foreign matter separated from the starch within the revoluble conical receptacle 16. The upper peripheral edge portion of the conical receptacle is provided with an annular depending apron 31 which is in vertical alinement with the upturned flange 29 and spaced therefrom a short distance to form an annular opening 32. A revoluble ring member 33 located within the inner periphery of the upturned flange overlaps the upper edge portion of the flange and the lower edge portion of the apron and covers the said annular opening 32. The ring member is carried by a pair of radial and upstanding arms 34 which are mounted on a collar 35 keyed to the upper end of the bevel gear 20 and rotate therewith. The collar 35 is positioned within the receptacle 8 and revolubly rests upon the bottom portion thereof to form a close fit to prevent the escape of starch through the bottom opening 36 of the receptacle. The radial arms 34 also have connected thereto flights or plates 37 shaped to conform to the cross section contour of the annular space 38 formed between the walls of the receptacles and the annular partition and serve to move the separated starch to the discharge opening 14 of the receptacle 8.

The annular partition 28 is provided with a plurality of discharge openings 39 which are covered by an annular screen 40 resting on top of the said partition. The screen and the openings are provided for a further separation of starch from foreign matter within the trough 30. In order to provide for this further separation just previously mentioned and to discharge the foreign matter from the trough 30 brushes 41 are provided which are connected to the ring member 33 by arms 42, the arms extending through the annular opening 32 which permits the brushes to rotate with the said ring member. The brushes in rotating sweep over the annular screen and carry the foreign matter around the trough until it is finally discharged through the spout 15.

Fixed brushes 43 and scrapers 44 positioned within the conical receptacle and engaging the inner surface of the screen portion thereof are supported from the cover 9 of the receptacle to which they are connected.

The starch is fed into the conical receptacle through a charging tube 45 which extends through the cover opening 12 to a point adjacent to the bottom portion of the said conical receptacle. The upper end of this charging tube opens into the casing 46 of an endless chain conveyer 47 which is adapted to supply the receptacle 8 with the starch which is to have the foreign matter separated therefrom. The casing extends horizontally to a point beyond the periphery of the receptacle and a downward extension 46' leads to a point close to the base 11 and is provided with an upturned charging hopper portion 48. The endless chain conveyer is guided over pairs of sprocket wheels 49 and 50 and is driven by the sprockets 51 located at the lower end portion of the casing. The flights 52 of the chain travel along the inner walls of the casing and carry the material from the lower end of the casing to the charging tube 45. The inner wall of the casing is rounded at the corner indicated by the numeral 53 to form an easy bend for the travel of the flights.

In order to elevate the separated starch to a height to be conveniently discharged into receiving receptacles (not shown) another conveyer chain 54 is provided which is inclosed within a discharge conveyer casing 55. The casing is provided with a receiving hopper portion 56 located beneath the discharge opening 14 of the casing 8 and from this hopper portion the conveyer casing extends upwardly and outwardly at an angle to a sufficient height to place a receiving receptacle beneath the discharge opening 57 of the said casing 55. The chain conveyer of this discharge casing is similar to the chain of the other casing and operates in the same manner. The chain is provided with flights 58 and is supported on pairs of sprocket wheels 59, 60 and 61. The sprocket wheels 61 located at the lower end of the discharge casing drive the conveyer chain and are mounted on a horizontal shaft 62 which projects outside of the casing and at its rear end is provided with a gear 63. The sprocket wheels 51 of the charging casing are also mounted on a horizontal shaft 64 and this shaft is provided with a gear wheel 65 which is in mesh with the gear 63 and drives the same. A belt wheel 66 mounted on the forward end of the shaft 64 has a belted connection 67 with the pulley 25 of the main drive shaft 22 and is driven thereby.

In use the starch is fed into the charging opening of the charging hopper and the conveyer chain will move the material up to the charging tube at which point it will drop through the tube into the rapidly revolving conical receptacle. The starch will be thrown outwardly by centrifugal force and will gradually work up the inclined screen wall of the receptacle, and in working upwardly the starch will be engaged by the fixed brushes and the scrapers and forced through the screen. As the foreign matter in the starch is usually of greater specific gravity than the powdered starch the weight co-acting with the centrifugal force and the inclined wall cause the said matter to rise above the upper edge of the conical receptacle and to drop into the annular trough where it will be further engaged by the trough brushes and finally discharged through the discharge spout of the main receptacle. In engaging the foreign matter the brushes will sweep the said matter over the screened bottom portion of the trough and clean off any starch which might cling to the foreign matter and force it through the bottom screen and into the annular starch space therebeneath. The starch which has been screened through the conical receptacle will drop into the annular starch space and be engaged by the flights of the said space and moved to the discharge opening of the main receptacle. The starch will drop through the discharge opening into the receiving hopper of the discharge casing and be engaged by the chain conveyer thereof and elevated to the discharge opening of the casing and will drop therethrough for further use.

From the foregoing description it will be seen that the starch separating machine is of simple construction and is well adapted for the purpose specified.

What we claim as our invention is:

1. A material separating machine, comprising in combination, a casing, an open top revoluble conical screen member mounted therein, means to revolve said screen member, means for feeding material to be separated to the screen member, means forming an annular trough around and below the top outer edge of the screen member with screened openings in the bottom wall thereof, and devices for removing material which does not pass through the bottom of the trough and other devices for removing material which passes both through the screen member and the trough.

2. A material separating machine with a material inlet opening and two outlet openings, comprising, a main receptacle, means to form an annular trough therein with a screened bottom, a cover for the main receptacle, a conical receptacle positioned within the main receptacle and formed in part of screen material, the upper edge of said conical receptacle being open and projecting above the trough, brushes mounted in the main receptacle to extend into the conical receptacle and engage the screen portion thereof, radial arms mounted in the receptacle and carrying flights positioned beneath the annular trough to move the material passing through the screened bottom and the conical receptacle, and brushes connected to the radial arms and extending into the trough, and means for rotating the conical member and the radial arms whereby the material forced from the conical receptacle into the trough and not capable of passing through the screened bottom will leave the receptacle at one outlet and the material passing through the trough bottom and the screen portion of the conical receptacle will pass through the other outlet opening.

3. A material separating machine, comprising a main receptacle having an annular medial partition forming an annular trough with a screened bottom portion, said receptacle having a foreign matter discharge opening communicating with the trough and an opening in the bottom portion of the receptacle, a cover for the receptacle having a charging opening, a conical receptacle positioned within the main receptacle and having its conical wall formed of screen material, the upper portion of said conical wall extending above the annular partition and spaced vertically therefrom, a brush and a scraper fixed to the main receptacle and extending into the conical receptacle, a radial arm mounted within the main receptacle and provided with a flight, a band covering the vertical space between the annular partition and the upper portion of the conical receptacle carried by the radial arm, a brush connected to said band and extending into the annular trough and engaging the screen thereof, and means for rotating the conical receptacle and the radial arm at different rates of speed.

In testimony whereof, we affix our signatures, in presence of two witnesses.

NELSON C. NEWELL.
JOHN A. HARRINGTON.

Witnesses:
GEORGE A. MALONE,
A. W. HART.